July 12, 1932. E. G. MERRICK 1,867,417
PROTECTION OF DYNAMO ELECTRIC MACHINES
Filed Oct. 8, 1930
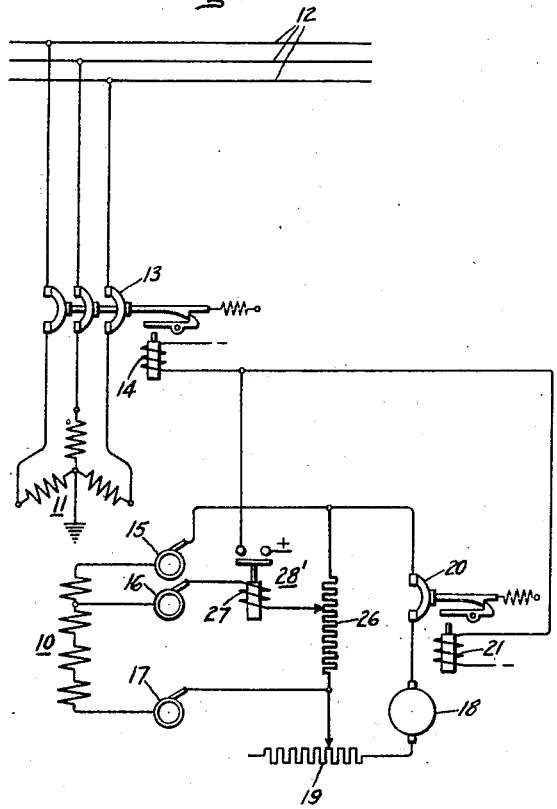
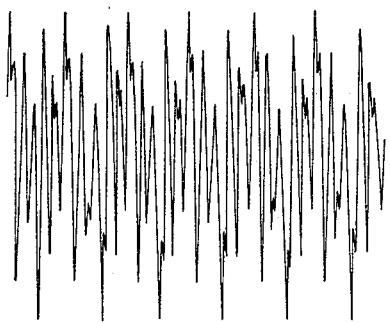
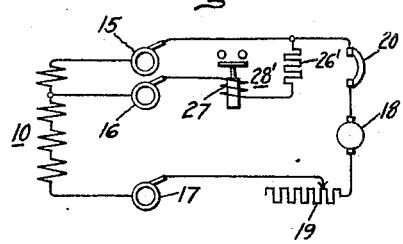
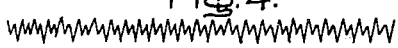
Inventor:
Eldridge G. Merrick,
by Charles E. Tullar
His Attorney.

Patented July 12, 1932

1,867,417

UNITED STATES PATENT OFFICE

ELDRIDGE G. MERRICK, OF SCHENECTADY, NEW YORK, ASSIGNOR TO GENERAL ELECTRIC COMPANY, A CORPORATION OF NEW YORK

PROTECTION OF DYNAMO-ELECTRIC MACHINES

Application filed October 8, 1930. Serial No. 487,273.

My invention relates to improvements in the protection of dynamo-electric machines, and more particularly to the protection of synchronous dynamo-electric machines against internal faults, and an object of my invention is to provide an improved arrangement for protecting dynamo-electric machines whereby to discriminate between faults within and without a machine and to obtain a high degree of sensitivity so that even an incipient fault can be readily detected prior to becoming of such a severe nature as to cause serious damage.

My invention will be better understood from the following description when considered in connection with the accompanying drawing and its scope will be pointed out in the appended claims.

This application is a continuation in part of my copending application Serial No. 433,456, filed March 5, 1930, for protection of dynamo-electric machines, certain of the subject matter in said prior application being incorporated in this application together with certain additional subject matter.

In the accompanying drawing, Fig. 1 illustrates diagrammatically a protective arrangement embodying my invention; Fig. 2 illustrates diagramamtically a modification of my invention; and Figs. 3 and 4 are wave forms representing the electromotive force conditions in different parts of the field winding of a synchronous dynamo-electric machine having a part of its armature winding short-circuited.

For the purpose of illustrating my invention I have shown in Fig. 1 a dynamo-electric machine having two relatively movable windings 10 and 11, which form respectively the field and armature windings of a synchronous machine such as a generator, condenser or motor. The armature winding 11 is arranged to be connected to a bus 12 by suitable circuit controlling means such as a circuit breaker 13, shown as of the latched-closed type and provided with a trip coil 14. It is immaterial which of the windings 10 and 11 is the rotor or stator winding, but in the figures of the drawing I have assumed that the field winding is the moving winding and it is accordingly provided with the necessary slip rings 15, 16 and 17. The circuit of the field winding 10 includes a suitable exciter unit 18 and a regulating resistance 19 and is arranged to be controlled by suitable means, shown as a latched-closed circuit breaker 20 provided with a trip coil 21.

In accordance with my invention, I provide means which is operative in response to a fault involving a portion of one of the machine windings such as the armature winding 11 and which may be so connected as to be energized in accordance with the relative values of the electromotive forces induced at any instant in two different predetermined numbers of turns of the other winding 10 by the relative movement of this winding and the faulty portion of the winding 11. As shown in Fig. 1, this means includes a suitable impedance means such as a resistor 26 which is connected across the field winding 10 and an electroresponsive control device such as a relay 28' having an energizing winding 27 which is connected between intermediate points of the resistor and the field winding. These intermediate points are so chosen as to be normally equi-potential and such that an alternating current sufficient to operate the relay 28' appears in the winding 27 thereof only on the occurrence of an internal short-circuit of the armature winding 11 or the field winding 10.

While I have shown the field winding 10 as including only four poles and the relay winding 27 connected across intermediate points corresponding to only one of these poles, it is to be understood that the total number of poles of the machine is not important and also that the intermediate points across which the relay winding is connected can be varied to suit individual designs of machines. Preferably the ratio between the greater and the lesser predetermined numbers of field winding turns is made as large as possible since this gives the maximum voltage unbalance. However, as the number of poles increases, the ratio may be decreased since by so doing it is possible to maintain on the relay an effective value of the unbalanced induced electromotive forces for a longer time and thus positively insure relay operation.

In accordance with my present invention, the resistor 26 is of such a type as to have a very low normal energy loss, and/or to provide great sensitivity, for example, a resistance material having a negative ampere characteristic with no time lag. Such a resistance material is disclosed in the copending application of K. B. McEachron, Serial No. 198,512, filed June 13, 1927, and assigned to the same assignee as this invention. In such a resistor the normal loss may be relatively low since its characteristic is of the exponential form $I = KE^n$, I and E being respectively the current in and the voltage across the resistor, K a constant and "n" an exponent greater than unity. Thus at normal excitation voltage, relatively small current appears in the resistor 26 and substantially no current appears in the relay winding 27.

With the arrangement shown in Fig. 1, the relay 28' is in effect differentially operated and the effect due to the direct excitation current is substantially zero. In case of a fault such as a short-circuit involving only a portion of the winding 11, each time that the short-circuited portion passes the winding on a field pole it induces therein an alternating electromotive force whose value is dependent on the number of turns short-circuited. For any given part or fraction of the field winding such as one pole, this electromotive force has a relatively high value as indicated by the largest peaks in the wave form shown in Fig. 3, but for the whole field winding the resultant alternating electromotive force is relatively small, as shown by the wave form of Fig. 4. This will be apparent since the voltage induced in the given fraction of the field winding is practically all consumed in the remainder of the winding inasmuch as the impedance of this winding is very large in comparison with the impedance of the circuit. In other words, for an internal fault on the winding 11, the voltage appearing across the field winding 10 is approximately zero but voltages appear periodically in the windings of the successive poles as they pass the short-circuited portion of the armature winding. The voltage per pole is not uniform and may be many times the voltage across the field winding 10 as Figs. 3 and 4 indicate. It will be apparent, therefore, that when the relatively high alternating electromotive force appears in the first or top pole winding, the intermediate points between which the relay winding 27 is connected are no longer equipotential. Consequently a difference current tends to flow in this winding and when sufficient produces operation of the relay 28' which may be arranged to control contacts in an auxiliary circuit for alarm indicating or tripping purposes such as the circuit of the trip coils 14 and 21. In case of a short circuit in the armature winding 11, the high voltage induced in the fraction of the field winding under consideration by the passage of the short-circuited turns causes a relatively large current to flow in the circuit of the relay winding 27. For a given voltage this current will be, by reason of the characteristic of the resistor 26, much greater than for a resistor whose resistance does not materially vary with the impressed voltage. If the field winding 10 is intact and a fault occurs external to the armature winding 11, for example a short-circuit on the bus 12, the voltage appearing across the field 10 is uniformly distributed, that is, each pole shares alike, so that no current flows between the equipotential points and the relay 28' does not operate. In case of an external fault with a short-circuit existing between sufficient field turns, the balance of the equipotential points will be disturbed. The relay 28' may be arranged to operate under these conditions.

In the embodiment of my invention shown in Fig. 2, only the field winding 10 and its appurtenances are shown. This illustration shows the relay winding 27 connected in circuit with a resistor 26' also of the negative ampere characteristic type across a predetermined number of field winding turns. In this case, where there is a tendency for field excitation current to appear in the relay winding 27, because of the lack of the differential effect, the amount of this current is comparatively small since at the relatively low excitation voltages employed, the resistance of the resistor 26' will be very high. For the relatively high alternating electromotive forces induced in the portion of the field winding across which the resistor 26' and the relay winding 27 are connected in series, a current sufficiently large to effect operation of the relay 28' will flow. Inasmuch as these relatively high induced electromotive forces appear only for internal faults, the relay 28' does not tend to operate on external faults.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States is:—

1. In combination, a synchronous dynamo-electric machine having relatively movable field and armature windings and means operative in response to the short-circuiting of a portion of the armature winding connected to be energized in accordance with the electromotive force induced in a predetermined number of field winding turns by the relative movement of the field winding and the short-circuited portion of the armature winding including a resistance having a negative ampere characteristic and an electroresponsive device in circuit therewith, said resistance and said device being connected across said predetermined number of field winding turns.

2. In combination, a synchronous dynamo-electric machine having relatively movable field and armature windings and means operative in response to the short-circuiting of a portion of the armature winding connected to be energized in accordance with the electromotive force induced in a predetermined number of field winding turns by the relative movement of the field winding and the short-circuited portion of the armature winding including a resistance having a negative ampere characteristic and a relay having a winding in series with said resistance, the circuit of said resistance and said relay winding being connected across said predetermined number of field winding turns.

3. In combination, a dynamo-electric machine having relatively movable field and armature windings and means operative in response to the short-circuiting of a portion of the armature winding connected to be energized in accordance with the electromotive force induced in a predetermined number of field winding turns by the relative movement of the field winding and short-circuited portions of the armature winding including a resistance having a negative ampere characteristic and substantially no time lag, and means having an energizing winding in circuit with said resistance, said energizing winding and said resistance being connected to be energized in accordance with the voltage across said predetermined number of field winding turns.

4. In combination, a synchronous dynamo-electric machine having relatively movable field and armature windings and means for controlling the circuit of one of said windings operative in response to the short-circuiting of a portion of the armature winding connected to be energized in accordance with the electromotive force induced in a predetermined number of field winding turns by the relative movement of the field winding and the short-circuited portion of the armature winding including a resistance having the characteristic $I=KE^n$, I and E being respectively the current in and the voltage across the resistance, K a constant and "n" a number greater than unity, and a relay having a winding in series with said resistance, the circuit of said relay winding and said resistance being connected across said predetermined number of field winding turns.

5. In combination, a dynamo-electric machine having relatively movable field and armature windings and means for controlling the circuit of one of said windings operative in response to the short-circuiting of a portion of the armature winding connected to be energized in accordance with the electromotive force induced in a predetermined number of field winding turns by the relative movement of the field winding and the short-circuited portion of the armature winding including a resistance having a negative ampere characteristic, said resistance being connected across said field winding and means having an energizing winding connected between normally equi-potential points of said field winding and said resistance.

In witness whereof, I have hereunto set my hand this 7th day of October, 1930.

ELDRIDGE G. MERRICK.